United States Patent
Woo

(10) Patent No.: US 8,953,568 B2
(45) Date of Patent: Feb. 10, 2015

(54) ROAMING METHOD AND APPARATUS FOR TERMINALS IN WIRELESS LOCAL AREA NETWORK

(75) Inventor: Yong Ha Woo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1100 days.

(21) Appl. No.: 12/485,368

(22) Filed: Jun. 16, 2009

(65) Prior Publication Data

US 2009/0312016 A1 Dec. 17, 2009

(30) Foreign Application Priority Data

Jun. 16, 2008 (KR) .................. 10-2008-0056239

(51) Int. Cl.
*H04W 4/00* (2009.01)
*H04W 52/02* (2009.01)
*H04L 29/06* (2006.01)
*H04W 12/06* (2009.01)

(52) U.S. Cl.
CPC ........... *H04W 52/0229* (2013.01); *H04L 63/08* (2013.01); *H04W 12/06* (2013.01); *H04L 63/162* (2013.01)
USPC ........... 370/338; 370/331; 370/332; 455/411; 455/432.1; 726/2; 726/3; 726/21

(58) Field of Classification Search
CPC ... H04W 36/14; H04W 84/045; H04W 36/08; H04W 60/00; H04W 36/00; H04W 68/12; H04W 92/02; H04W 36/0038; H04W 48/20; H04W 12/06; H04L 2209/80; H04L 9/0844; H04L 63/08; H04J 11/0093; Y02B 60/50

USPC ........ 370/338, 332; 455/432.1, 411; 380/247; 726/2, 3, 21
See application file for complete search history.

(56) References Cited

U.S. PATENT DOCUMENTS

| | | | |
|---|---|---|---|
| 7,324,478 B2 | 1/2008 | Park et al. | |
| 2003/0143999 A1* | 7/2003 | Funato et al. | 455/435 |
| 2004/0068668 A1* | 4/2004 | Lor et al. | 713/201 |
| 2005/0277417 A1* | 12/2005 | Yoon et al. | 455/436 |
| 2006/0178127 A1* | 8/2006 | Kawasaki | 455/343.2 |
| 2007/0238437 A1* | 10/2007 | Jaakkola | 455/343.1 |
| 2008/0130581 A1 | 6/2008 | Hwang et al. | |
| 2008/0320492 A1* | 12/2008 | James et al. | 719/314 |
| 2009/0181661 A1* | 7/2009 | Kitazoe et al. | 455/418 |
| 2010/0218012 A1* | 8/2010 | Joseph et al. | 713/310 |
| 2011/0130141 A1* | 6/2011 | Frost et al. | 455/436 |

FOREIGN PATENT DOCUMENTS

| | | |
|---|---|---|
| KR | 10-2003-0020652 A | 3/2003 |
| KR | 10-2004-0019681 A | 3/2004 |
| KR | 10-2008-0035856 A | 4/2008 |
| KR | 10-2008-0045152 A | 5/2008 |
| WO | 2007/024346 A1 | 3/2007 |

* cited by examiner

*Primary Examiner* — Allahyar Kasraian
(74) *Attorney, Agent, or Firm* — Jefferson IP Law, LLP

(57) ABSTRACT

A roaming method and a data transmission system for a portable terminal in a Wireless Local Area Network (WLAN) are provided. The method includes transitioning to an active mode, by a control unit in a standby mode in response to a request from a WLAN module during roaming from a first Access Point (AP) to a second AP, and performing authentication in conjunction with a server, by the control unit in the active mode. As a result, when a portable terminal roams in a WLAN, the network connection is not disrupted.

18 Claims, 5 Drawing Sheets

ROAMING METHOD AND APPARATUS FOR TERMINALS IN WIRELESS LOCAL AREA NETWORK

PRIORITY

This application claims the benefit under 35 U.S.C. §119 (a) of a Korean patent application filed in the Korean Intellectual Property Office on Jun. 16, 2008 and assigned Serial No. 10-2008-0056239, the entire disclosure of which is hereby incorporated by reference.

BACKGROUND OF THE INVENTION

1. Field of the Invention

The present invention relates generally to roaming of a portable terminal in a Wireless Local Area Network (WLAN). More particularly, the present invention relates to a roaming method and apparatus for a WLAN requiring authentication for connecting to an Access Point (AP), wherein when a portable terminal in a standby mode is roaming between APs, the portable terminal is switched to an active mode for authentication.

2. Description of the Related Art

With increased popularity of wireless portable terminals, various efforts have been made to improve the performance and function of portable terminals. With advances in communication technologies, portable terminals support both voice calls and data calls based on packet switching for transmitting various data. Data call processing requiring relatively high power consumption has increased interest in power saving schemes for portable terminals with limited battery power.

A "Wake on WLAN" (WoW) mechanism, where a host or a control unit of a portable terminal is placed in a standby mode and is transitioned to an active mode only when needed, is one example of such power saving schemes.

When a portable terminal moves in a WLAN, roaming may have to be performed between Access Points (APs). More particularly, when connection to an access point requires authentication, a time delay may arise due to a search for a new AP and authentication requirements and data loss may occur during roaming. To overcome the problems of time delay and data loss, many schemes, such as roaming with pre-authentication have been proposed.

The WoW mechanism may cause a problem during roaming. As disclosed in the wireless network Institute of Electrical and Electronics Engineers (IEEE) 802.1x standard, the host or the control unit of a portable terminal performs signal transmission and reception while an authentication procedure is performed. Thus, if the control unit of the portable terminal is in standby mode when the authentication procedure is being performed, the authentication procedure may not be completed. Therefore, the network connection may be disrupted.

Therefore, a need exists for roaming method and apparatus for a portable terminal that maintains a network connection during roaming in a WLAN.

SUMMARY OF THE INVENTION

An aspect of the present invention is to address at least the above-mentioned problems and/or disadvantages and to provide at least the advantages described below. Accordingly, an aspect of the present invention is to provide a roaming method and apparatus that enable a portable terminal in standby mode to maintain a network connection during roaming in a Wireless Local Area Network (WLAN).

In accordance with an aspect of the present invention, a roaming method for a portable terminal in a WLAN is provided. The method includes transitioning to an active mode, by a control unit in a standby mode in response to a request from a WLAN module during roaming from a first Access Point (AP) to a second AP, performing authentication, by the control unit in the active mode, and transitioning to the standby mode, by the control unit, when authentication is successful.

In accordance with another aspect of the present invention, a portable terminal connectable to Access Points (APs) in a WLAN is provided. The terminal includes a WLAN module for outputting an active mode transition request signal during roaming from a first AP to a second AP, and a control unit for transitioning to an active mode, upon reception of the active mode transition request signal in a standby mode, for performing authentication and for transitioning to the standby mode, when data to process is not present for a preset time.

In accordance with still another aspect of the present invention, a data transmission system in a WLAN is provided. The system includes Access Points (APs) connectable to portable terminals in the WLAN for transmitting and receiving data, a portable terminal comprising a WLAN module for outputting an active mode transition request signal during roaming between the APs, and comprising a control unit for transitioning from a standby mode to an active mode upon reception of the active mode transition request signal, and a server connected to the APs and for performing authentication.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In exemplary embodiments of the present invention, the term 'roaming' refers to roaming between Access Points (APs) having a common Service Set Identifier (SSID). That is, when the Received Signal Strength Indication (RSSI) value of a signal received from a current AP is less than or equal to a roaming trigger threshold, the portable terminal searches for another AP having the same SSID with an acceptable RSSI value, and connects to the found AP to maintain a connection to an Internet Protocol (IP) network.

The term 'authentication' refers to authentication performed through a procedure involving a server and a control unit of a portable terminal. For example, an authentication procedure in an Extensible Authentication Protocol (EAP) specified by the Institute of Electrical and Electronics Engineers (IEEE) 802.1x standard involves entities, such as a peer (supplicant), an authenticator and an EAP server. The EAP authentication is supported by, for example, EAP-Transport Layer Security (TLS), EAP-Tunneled Transport Layer Security (TTLS), and EAP-Flexible Authentication via Secure Tunneling (FAST).

The term 'standby mode' refers to a state where the control unit or a Central Processing Unit (CPU) of the portable terminal is in a suspend mode to reduce power consumption. Additionally, a controller of a Wireless Local Area Network (WLAN) module by itself may transition to a power saving state.

Figure 1:
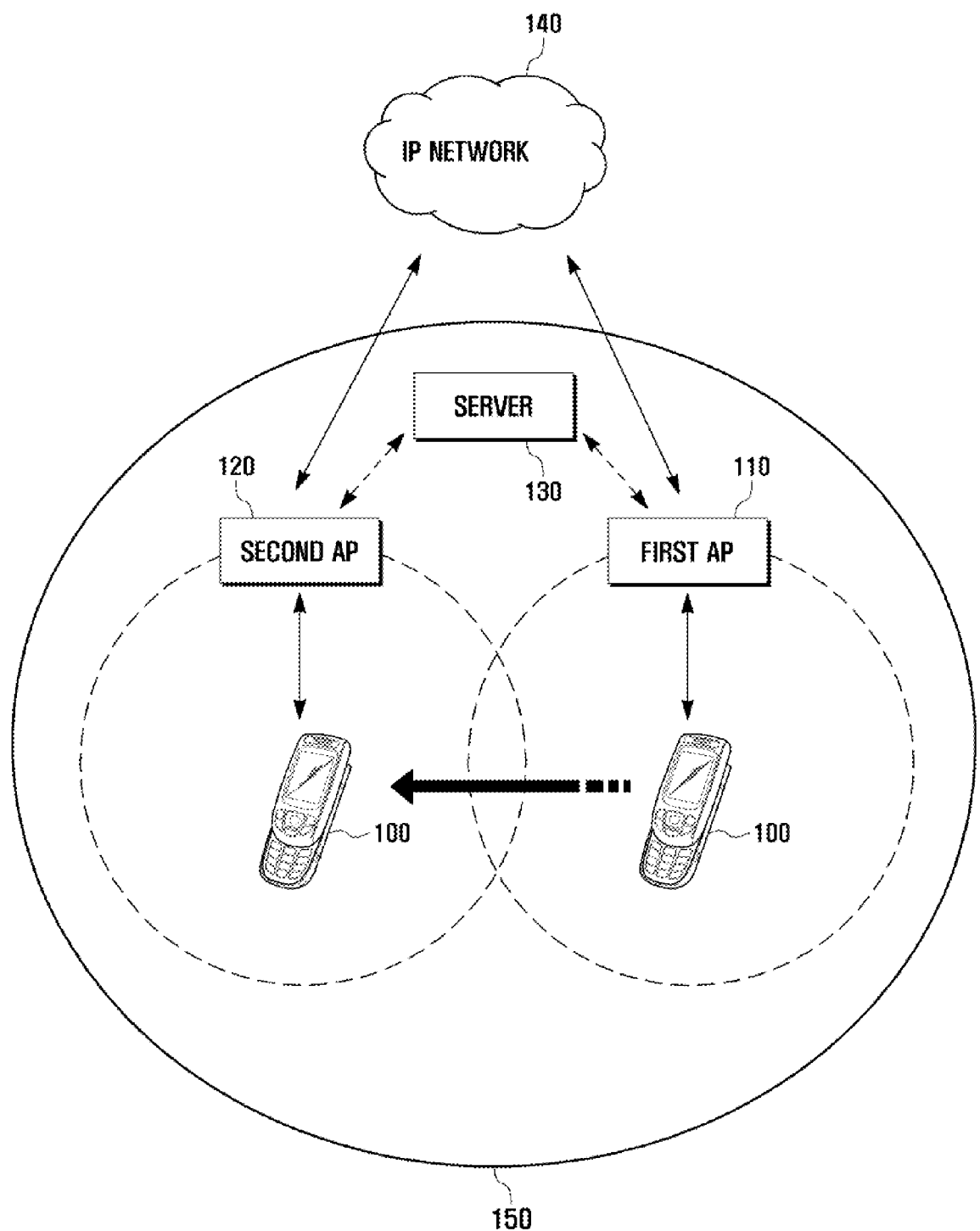
FIG. 1 illustrates a Wireless Local Area Network (WLAN) according to an exemplary embodiment of the present invention.

FIG. 1 illustrates a WLAN according to an exemplary embodiment of the present invention.

Referring to FIG. 1, a portable terminal 100 in the WLAN 150 may connect to an IP network 140 through a first AP 110 or a second AP 120.

The IP network 140 may be any network connectable to the first AP 110 or the second AP 120, such as another WLAN or an Internet network.

The portable terminal 100 may be any device equipped with a WLAN module and capable of wireless local area communication, such as a personal digital assistant, a laptop computer or a communication terminal.

A server 130 performs operations for authentication, authorization and accounting in relation to users and portable terminals. More particularly, the server 130 performs an authentication procedure together with the control unit of the portable terminal 100, and allows or disallows the portable terminal 100 to access the IP network 140 based on the authentication result.

In addition to the first AP 110 and the second AP 120 illustrated in FIG. 1, many other APs may be present in the WLAN 150. The portable terminal 100 may roam between the APs if necessary. An AP may include a controlled port and an uncontrolled port. The controlled port is open after the portable terminal 100 is authenticated and used for data input and data output. The uncontrolled port is open regardless of authentication. Authentication may be performed through the uncontrolled port.

Figure 2:
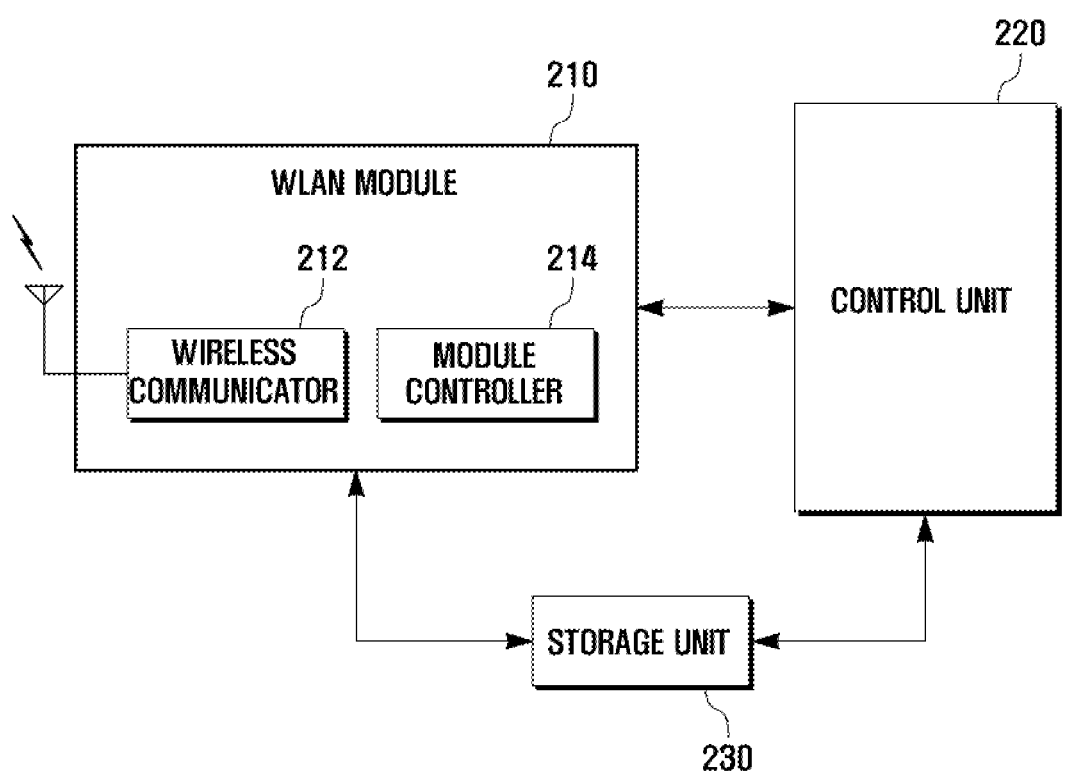
FIG. 2 is a block diagram of a portable terminal according to an exemplary embodiment of the present invention.

FIG. 2 is block diagram of the portable terminal 100 according to an exemplary embodiment of the present invention. In FIG. 2, components related to a wireless local area communication are illustrated, and the portable terminal 100 may further include other components if necessary.

Referring to FIG. 2, the portable terminal 100 may include a WLAN module 210, a control unit 220 and a storage unit 230.

The WLAN module 210 includes a wireless communicator 212 for performing wireless local area communication, and a module controller 214. For wireless local area communication, the wireless communicator 212 may include a transmitter for upconverting frequency of a signal to be transmitted and for amplifying the signal. The wireless communication may also include a receiver for low-noise amplifying a received signal and for downconverting the frequency of the received signal. The module controller 214 may be a processor controlling the overall operation of the WLAN module 210. More particularly, the module controller 214 measures strength of a signal from a current AP to obtain an RSSI value. If the RSSI value is less than or equal to the roaming trigger threshold, the module controller 214 initiates a roaming procedure where another AP having the same SSID with an acceptable RSSI value is searched for and a connection to the found AP is made.

Further, when authentication is required for AP connection, if the roaming procedure is to be performed while the control unit 220 is in standby mode, the module controller 214 transmits an active mode transition request signal to the control unit 220. The module controller 214 may receive an active mode transition complete signal or a standby mode transition complete signal from the control unit 220. The module controller 214 may be aware of whether the control unit 220 is in active mode or standby mode based on an active mode transition complete signal and standby mode transition complete signal. The module controller 214 may store in the storage unit 230 information regarding an authentication requirement for AP connection and the current mode of the control unit 220.

The control unit 220 controls the overall operation of the portable terminal 100. More particularly, when authentication is required for the connection between the portable terminal 100 and the first AP 110, the control unit 220 performs authentication together with the server 130. The control unit 220 transitions to a standby mode for saving power when data to process is not present for a preset time or when a request is issued by the user. The control unit 220 also transitions from the standby mode to an active mode when data to process is present or when an active mode transition request signal is received from the module controller 214. The control unit 220 transmits a standby mode transition complete signal to the module controller 214 after transitioning from the active mode to the standby mode, and transmits an active mode transition complete signal after transitioning from the standby mode to the active mode.

The storage unit 230 may store an authenticated connection indicator (bIsAuthConnect) that indicates whether authentication is required for connecting between the portable terminal 100 and an AP.

Figure 3:
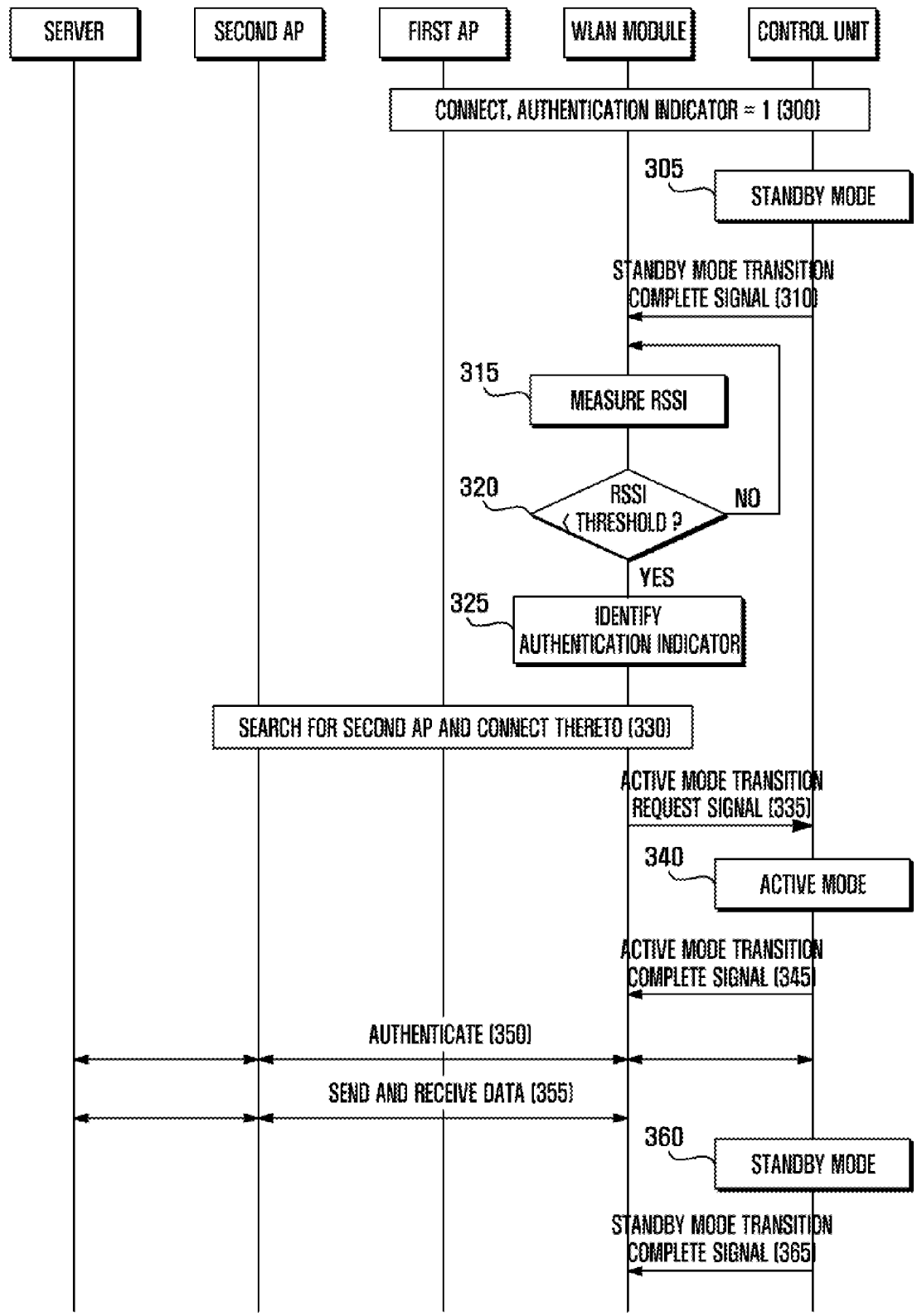
FIG. 3 is a sequence diagram illustrating signal exchange between a WLAN module, a control unit, a first Access Point (AP), a second AP and a server in a roaming method according to an exemplary embodiment of the present invention.

FIG. 3 is a sequence diagram illustrating signal exchange between a WLAN module, a control unit, a first AP, a second AP and a server in a roaming method according to an exemplary embodiment of the present invention.

Referring to FIG. 3, the portable terminal connects to the first AP in step 300. At this time, if authentication is required for the connection, the WLAN module of the portable terminal sets the authenticated connection indicator to 1, and stores the indicator in the storage unit.

When data to process is not present for a preset time or when a request is issued by the user, the control unit transitions to a standby mode in step 305. The control unit may transmit a standby mode transition complete signal to the module controller immediately after transitioning to the standby mode in step 310.

The WLAN module periodically measures the strength of a signal from the first AP to obtain an RSSI value in step 315, and verifies whether the RSSI value is less than the roaming trigger threshold in step 320. If the RSSI value is less than the roaming trigger threshold, the WLAN module examines the authenticated connection indicator to identify the authentication requirement in step 325.

If the authenticated connection indicator is set to 1 (i.e., authentication required), the module controller of the WLAN module searches for a second AP with an acceptable RSSI value and connects to the found second AP in step 330. When authentication is required, the controlled port of the second AP is not open and only the uncontrolled port is open for performing an authentication procedure.

Based on a standby mode transition complete signal reception in step 310, the module controller is aware that the control unit is in the standby mode, and transmits an active mode transition request signal to the control unit in step 335. In response to the active mode transition request signal, the control unit transitions to the active mode in step 340, and may transmit an active mode transition complete signal to the WLAN module in step 345.

Thereafter, the control unit in the active mode performs authentication together with the server through the uncontrolled port of the second AP in step 350.

Figure 4:
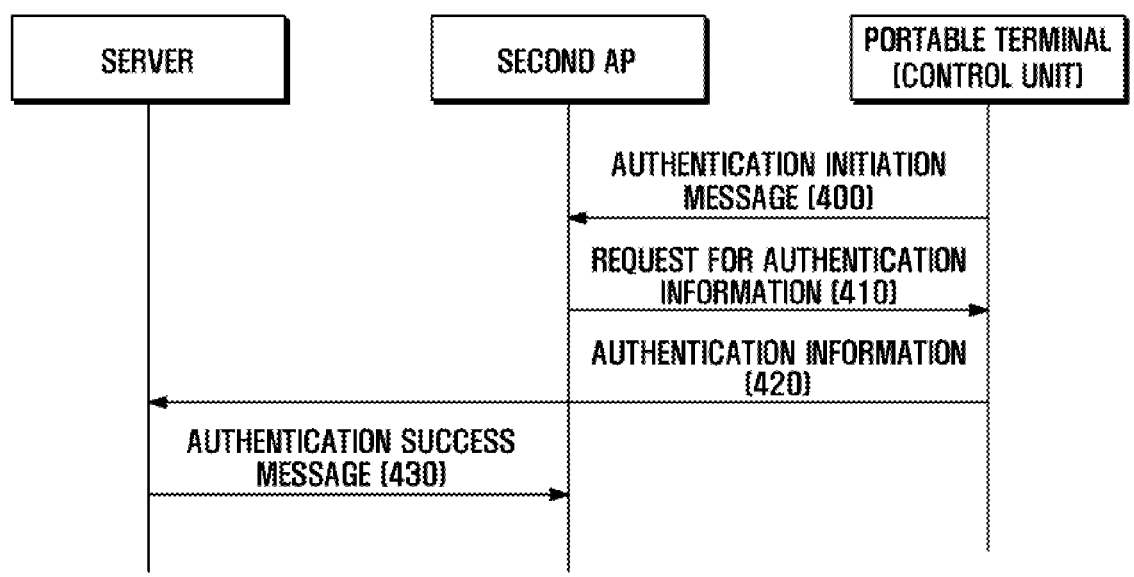
FIG. 4 is a sequence diagram illustrating an authentication procedure in a roaming method according to an exemplary embodiment of the present invention.

FIG. 4 is a sequence diagram illustrating an authentication procedure in a roaming method according to an exemplary embodiment of the present invention.

Referring to FIG. 4, authentication may be performed through cooperation between the control unit, the server and the second AP. The control unit transmits an authentication initiation message to the second AP in step 400. In return, the second AP transmits a request for subscriber authentication information to the control unit in step 410. In response to the request, the control unit transmits subscriber authentication information via the second AP to the server in step 420. The server transmits an authentication success message to the second AP in step 430. Upon reception of the authentication success message, the second AP opens the controlled port for data transmission and reception.

As described above, authentication is performed by the control unit of a portable terminal, the server and the AP. Hence, the control unit in standby mode transitions to active mode during authentication.

Referring back to FIG. 3, when authentication is successful in step 350, the WLAN module may transmit and receive data through the controlled port of the second AP in step 355. That is, the portable terminal may connect to an IP network through the second AP and the server. At this time, the control unit may transition to the standby mode for power saving in step 360, and transmit a standby mode transition complete signal to the module controller in step 365.

Figure 5:
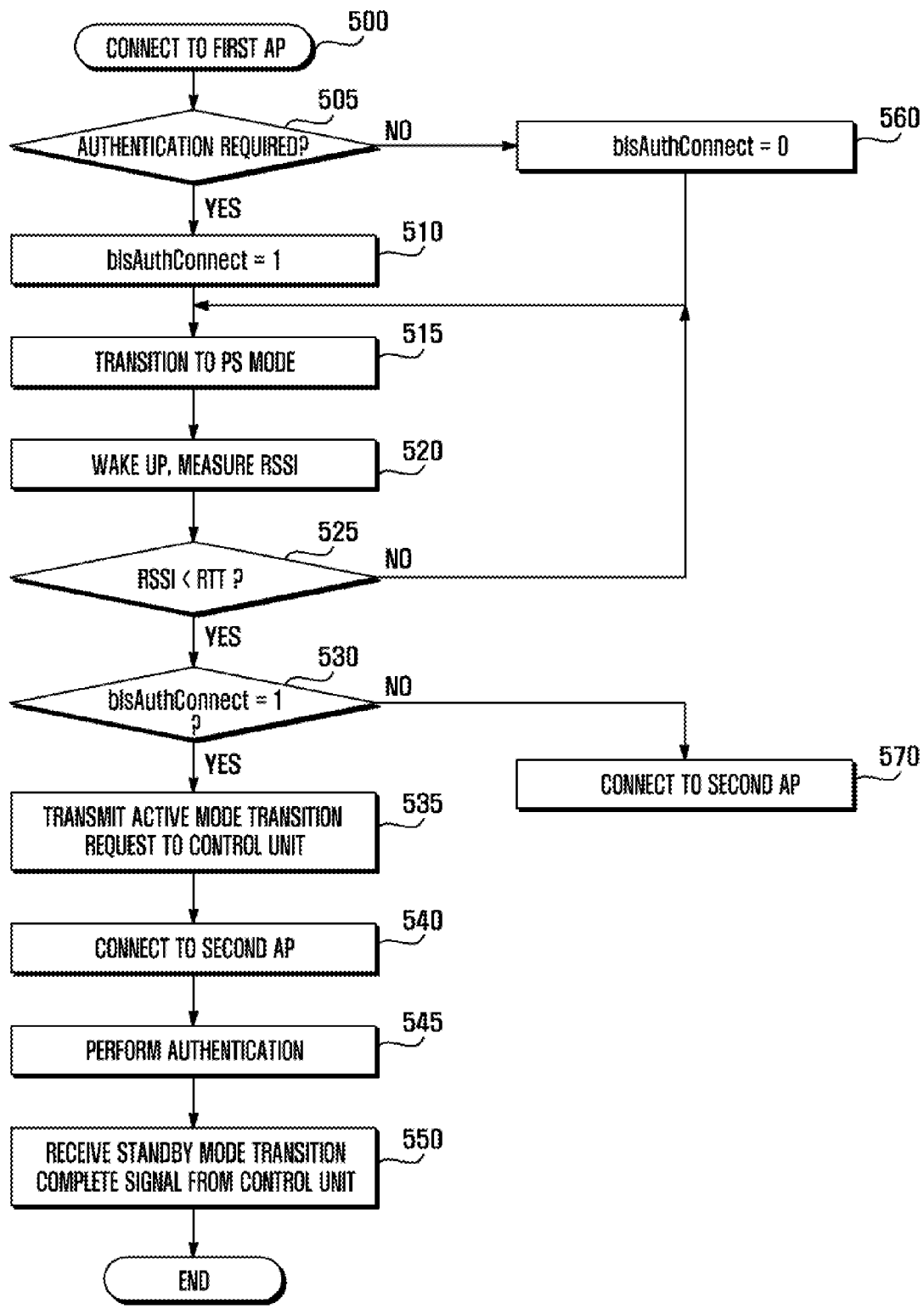
FIG. 5 is a flowchart illustrating an operation of a WLAN module in a roaming method according to an exemplary embodiment of the present invention.

FIG. 5 is a flowchart illustrating an operation of a WLAN module according to an exemplary embodiment of the present invention.

Referring to FIG. 5, the WLAN module connects to the first AP in step 500. The WLAN module verifies whether authentication is required for the connection in step 505. If authentication is required, the WLAN module sets the authenticated connection indicator to 1 and stores the indicator in the storage unit in step 510. When data to process is not present for a preset time or when a request is issued by the user, the control unit may transition to a standby mode and transmit a standby mode transition complete signal to the WLAN module.

The WLAN module transitions to a power saving mode in step 515. During the power saving mode, the WLAN module periodically wakes up to measure the strength of a signal from the first AP for obtaining an RSSI value in step 520, and verifies whether the RSSI value is less than the roaming trigger threshold in step 525. If the RSSI value is less than the roaming trigger threshold, the WLAN module examines the authenticated connection indicator to identify the authentication requirement in step 530.

If the authenticated connection indicator is set to 1 (i.e., authentication required), the WLAN module transmits an active mode transition request signal to the control unit in step 535. The WLAN module may receive an active mode transition complete signal from the control unit, and searches for a second AP with an acceptable RSSI value and connects to the found second AP in step 540. In an exemplary implementation, steps 535 and 540 may be performed in parallel.

The control unit performs authentication together with the server through the second AP in step 545. Authentication may be performed using the procedure described in FIG. 4. When authentication is successful, the controlled port of the second AP is open, and the portable terminal may transmit and receive data to and from an IP network through the controlled port of the second AP. Thereafter, when data to process is not present for a preset time or when a request is issued by the user, the control unit may transition to a standby mode. The WLAN module may receive a standby mode transition complete signal from the control unit in step 550.

If authentication is not required in step 505, the WLAN module sets the authenticated connection indicator to 0 and stores the indicator in the storage unit in step 560. When authentication is not required, a normal roaming procedure is performed without the control unit in standby mode transitioning to an active mode. That is, without waking up the control unit, the WLAN module searches for a second AP with an acceptable RSSI value and connects to the found second AP in step 570. The controlled port of the second AP may be open.

As described above, when authentication is required for AP connection, the mode of the control unit is adaptively switched between active mode and standby mode for efficient roaming. When authentication is not required for AP connection, roaming may be performed by the WLAN module itself without a mode transition of the control unit.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A roaming method for a portable terminal in a Wireless Local Area Network (WLAN), the method comprising:
   determining, by a WLAN module, whether authentication is required for Access Point (AP) connection;

transitioning to an active mode, by a control unit in a standby mode when the authentication is determined to be required, in response to a request from the WLAN module during roaming from a first Access Point (AP) to a second AP;

performing, by the control unit in the active mode, authentication with a server; and performing roaming by the WLAN module, when the authentication is not determined to be required, without transitioning the control unit to the active mode.

2. The method of claim 1, further comprising:
transitioning to the standby mode by the control unit, when authentication is successful.

3. The method of claim 1, wherein the transitioning to the active mode comprises transmitting, by the WLAN module, an active mode transition request signal to the control unit.

4. The method of claim 3, wherein the transitioning to the active mode comprises transmitting an active mode transition complete signal to the WLAN module by the control unit after transitioning to the active mode.

5. The method of claim 1, wherein the control unit performs authentication together with the server through the second AP.

6. The method of claim 5, wherein the performing of the authentication comprises:
transmitting, by the control unit, an authentication initiation message to the second AP;
transmitting, by the second AP in reply to the message, a request for subscriber authentication information to the control unit;
transmitting, by the control unit in reply to the request, subscriber authentication information via the second AP to the server; and
receiving, by the second AP, an authentication success message from the server.

7. A portable terminal connectable to Access Points (APs) in a Wireless Local Area Network (WLAN), the terminal comprising:
a WLAN module configured to determine whether authentication is required for Access Point (AP) connection, to output an active mode transition request signal during roaming from a first AP to a second AP when the authentication is determined to be required, and to perform roaming when the authentication is not determined to be required; and
a control unit configured to transition to an active mode upon reception of the active mode transition request signal in a standby mode, to perform authentication with a server, and to transition to the standby mode, when data to process is not present for a preset time.

8. The terminal of claim 7, wherein the WLAN module performs comprises a module controller for transmitting an active mode transition request signal to the control unit, when authentication is required for AP connection while the control unit is in the standby mode.

9. The terminal of claim 7, wherein the control unit transmits an active mode transition complete signal to the WLAN module after transitioning to the active mode.

10. The terminal of claim 9, wherein the control unit transmits a standby mode transition complete signal to the WLAN module after transitioning from the active mode to the standby mode.

11. The terminal of claim 10, wherein the module controller receives at least one of the active mode transition complete signal and the standby mode transition complete signal from the control unit to determine if the control unit is in one of the active mode and the standby mode.

12. The terminal of claim 7, further comprising a storage unit for storing an indicator of authentication requirement for connection between the portable terminal and an AP.

13. The terminal of claim 12, wherein the WLAN module stores in the storage unit the indicator of authentication requirement between the portable terminal and the first AP.

14. A data transmission system in a Wireless Local Area Network (WLAN), the system comprising:
Access Points (APs) connectable to portable terminals in the WLAN that are configured to transmit and receive data; and
a portable terminal comprising:
a WLAN module configured to determine whether authentication is required for Access Point (AP) connection, to output an active mode transition request signal during roaming between the APs when the authentication is determined to be required, and to perform roaming when the authentication is not determined to be required;
a control unit configured to transition from a standby mode to an active mode upon reception of the active mode transition request signal; and
a server connected to the APs that is configured to perform authentication.

15. The system of claim 14, wherein the WLAN module performs the authentication between the control unit and the server.

16. The system of claim 14, wherein the control unit transitions to the standby mode when authentication is successful.

17. The system of claim 14, wherein the control unit transmits an active mode transition complete signal to the WLAN module after transitioning from the standby mode to the active mode.

18. The system of claim 17, wherein the control unit transmits a standby mode transition complete signal to the WLAN module after transitioning from the active mode to the standby mode.

* * * * *